United States Patent [19]

Hashemi et al.

[11] Patent Number: 5,857,112
[45] Date of Patent: Jan. 5, 1999

[54] SYSTEM FOR ACHIEVING ENHANCED PERFORMANCE AND DATA AVAILABILITY IN A UNIFIED REDUNDANT ARRAY OF DISK DRIVES BY USING USER DEFINED PARTITIONING AND LEVEL OF REDUNDANCY

[76] Inventors: Ebrahim Hashemi, 1165 Smith Ave., Campbell, Calif. 95008; Martin Schulze, 14213 N. 107th St., Longmont, Colo. 80501; Jim Morris, 828 Bay St., Mountain View, Calif. 94041; Bob Harper, 2300 W. 235th St., Torrance, Calif. 90501; Swami Nathan, 4812 Rue Calais, San Jose, Calif. 95136; Paul Boulay, 201 Hardy Ave., Campbell, Calif. 95008; Dave Scheffey, 1315 Hanchett Ave., San Jose, Calif. 95126

[21] Appl. No.: 943,410

[22] Filed: Sep. 9, 1992

[51] Int. Cl.$^6$ .............................. G06F 11/00; G06F 11/16
[52] U.S. Cl. ..................... 395/828; 395/441; 364/952.1; 364/956.2; 364/965; 364/944.2; 371/10.1
[58] Field of Search .................................. 371/10.1, 40.1; 395/800, 425, 275, 200, 575, 828, 441

[56] References Cited

U.S. PATENT DOCUMENTS

| | | | |
|---|---|---|---|
| 4,947,477 | 8/1990 | Little | 364/200 |
| 5,159,608 | 10/1992 | Falconer et al. | 375/1 |
| 5,167,032 | 11/1992 | Martin et al. | 395/575 |
| 5,237,658 | 8/1993 | Walker et al. | 395/200 |
| 5,257,362 | 10/1993 | Menon | 395/425 |
| 5,257,391 | 10/1993 | DuLac et al. | 395/800 |
| 5,301,297 | 4/1994 | Menon et al. | 395/425 |
| 5,303,244 | 4/1994 | Watson | 371/10.1 |

OTHER PUBLICATIONS

Relying on Raid; Doug McLean; DEC User; Feb., 1992; p. 43(1).
Orthogonal Concepts in Array Technology, Sep. 10, 1990 at Disc Array Forum.
Maximizing Performance in a Striped Disk Array, 1990 by IEEE.
Performance Consequences of Parity Placement, 1990 by ACM.

*Primary Examiner*—Thomas C. Lee
*Assistant Examiner*—Rehana Krick

[57] ABSTRACT

The present invention provides a system of hardware and software that combine to efficiently integrate the various requirements for system performance and system reliability in a RAID system. A user of the present invention is able to select from a range of system performance and reliability configurations, independently of each other. From user specifications, the present invention initially constructs a user space which must be mapped onto the physical storage space in the array of disk drives. The present invention preserves the orthogonality of performance and reliability concepts through a series of mappings that relate to these concepts independently as it transforms user space into the physical space of the disk array.

16 Claims, 17 Drawing Sheets

Level 1

450 corresponds to level 2 with stripe unit size = 1 and stripe degree = 4 etc.

SYSTEM FOR ACHIEVING ENHANCED PERFORMANCE AND DATA AVAILABILITY IN A UNIFIED REDUNDANT ARRAY OF DISK DRIVES BY USING USER DEFINED PARTITIONING AND LEVEL OF REDUNDANCY

BACKGROUND OF THE INVENTION

1. Field of the Invention

This invention relates generally to redundant storage in an array of secondary storage means and, in particular, to providing a flexible, orthogonal implementation of user system performance and data availability goals in the array of secondary storage means.

2. Prior Art

Redundant arrays of inexpensive disk drives (RAIDs) have evolved as an alternative scheme for implementing secondary storage to earlier systems employing a single, large disk drive. The main reason for this scheme is to match secondary storage access with ever increasing processing speed. Typically, the speed of data transfer to and from a single, large disk is much slower than the processing speed of the central processing unit (CPU). To increase system throughput, the RAID scheme of secondary storage allows for the concurrent access of data from multiple disk drives.

Typically, RAID architectures consist of one or more host interface controllers connected to several peripheral interface controllers via a high speed data bus. Each peripheral interface controller is, in turn, connected to several individual disk drives which provide the secondary storage for the connected hosts. Peripheral interface controllers can be connected to the disk drives via common communication interfaces, i.e. SCSI. Generally, the speed of the data bus is much greater than the speed of the interface between the disk drives and the peripheral interface controllers.

One way to increase concurrent access is to efficiently distribute the data for a given process across the array of disks drives. This distribution of data is called striping. The amount of striping in a given distribution scheme is called the stripe degree. The stripe degree is equal to the number of disk drives across which the data is distributed. To maximize concurrent access, however, the data should be striped to disk drives connected to different peripheral interface controllers. For example, sector 1 (or some other unit of data) of the host's data might be stored on some disk attached to peripheral interface controller 1, sector 2 on another disk attached to peripheral interface controller 2, etc.

Striping, together with data buffering, takes better advantage of the full data bus bandwidth. For example, suppose a host makes a read request for data resident on all the disk drives to which its data has been striped. These disk drives are then required to transmit their data, through their respective peripheral interface controllers, onto the data bus for subsequent transmission to the host interface controller.

If a disk is ready to transmit its data and the data bus is unavailable, each peripheral interface controller typically has a buffer into which the data can be temporarily stored. These buffers match the speed of transmission rates of the data bus. For example, if the data bus operates at 25 Megabytes per second and the SCSI lines operate at 5 Megabytes per second, then the data from the disk drives fill up the buffer at 5 Mbytes/sec and is transmitted from the buffer onto the data bus at 25 Mbytes/sec. In this example, the striping allows for several disk drives to buffer their data concurrently into their peripheral interface controllers, while the speed matching buffers allow for transmission onto the data bus at rates approaching that of the data bus. The bandwidth of the data bus is therefore better utilized.

With the advantage of increased throughput, there are, however, disadvantages associated with the striping scheme. For example, reliability is an intrinsic problem with striping. Generally, the mean time to fail for a single disk drive in an array of drives is much less than a single, large, expensive disk. Moreover, this disparity in mean time to fail increases as the number of disk drives in the array increase.

Mean time to fail for any given disk in the array, however, is not necessarily the most appropriate measure of reliability. Mean time to data loss in a system is generally a more appropriate measure. In a single disk drive scheme, the failure of a single disk drive equates to immediate data loss. Such data loss need not be irreparable. It is possible that a human operator may be able to replace the disk and recover the data from the failed disk. Such a possibility exists if, for example, the only damage to the disk occurred in the file allocation table. In such a case, it is more appropriate to classify the data as unavailable rather than lost. The length of time to remedy such unavailability is measured by the time it takes to physically replace the disk and recover the data.

Similarly, in the case of a RAID scheme, the failure of a single disk in the array does not necessarily equate to data loss. Moreover, by using a variety of redundancy methods, the failure of a single disk in an array does not have the same degree of data unavailability as that of a single disk scheme. Data from an arbitrary number (depending upon the coding scheme) of disks may be reconstructed dynamically by the system without the need to replace any disks. Thus, the time length of data unavailability can be made very small; while the mean time to data loss can be made very large.

These two concepts, system performance (as measured by the degree of striping and concurrency) and data availability (as measured by degree of redundancy), in the RAID context are orthogonal, i.e. independent of each other. Thus, increasing the level of redundancy and availability of data in the array does not generally translate into an increase in system throughput and vice versa.

However, even though performance and reliability are orthogonal, these concepts are muddled in current RAID systems. A user of RAID storage should be able to specify the level of system performance and data reliability desired, independently of the other. Additionally, a RAID system should be flexible enough to allow a user to select from a range of performance and reliability configurations, depending upon a number of considerations, such as the cost of storage for different configurations.

For example, one user may place a premium on data reliability and request a high mean time to data loss for the storage service. This might translate into a greater number of redundancy units per array group. Another user, however, may desire high system throughput which would require a high degree of data striping. This, in turn, might require a smaller number of redundancy units to increase the degree of data striping of the user's data. Lastly, some users might require both high performance and availability on a given data partition.

SUMMARY OF THE INVENTION

The present invention provides a system of hardware and software that combine to efficiently integrate the various requirements for system performance and system reliability in a RAID system. A user of the present invention is able to select from a range of system performance and reliability configurations, independently of each other.

From user specifications, the present invention initially constructs a user space which must be mapped onto the physical storage space in the array of disk drives. The present invention preserves the orthogonality of performance and reliability concepts through a series of mappings that relate to these concepts independently as it transforms user space into the physical space of the disk array.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
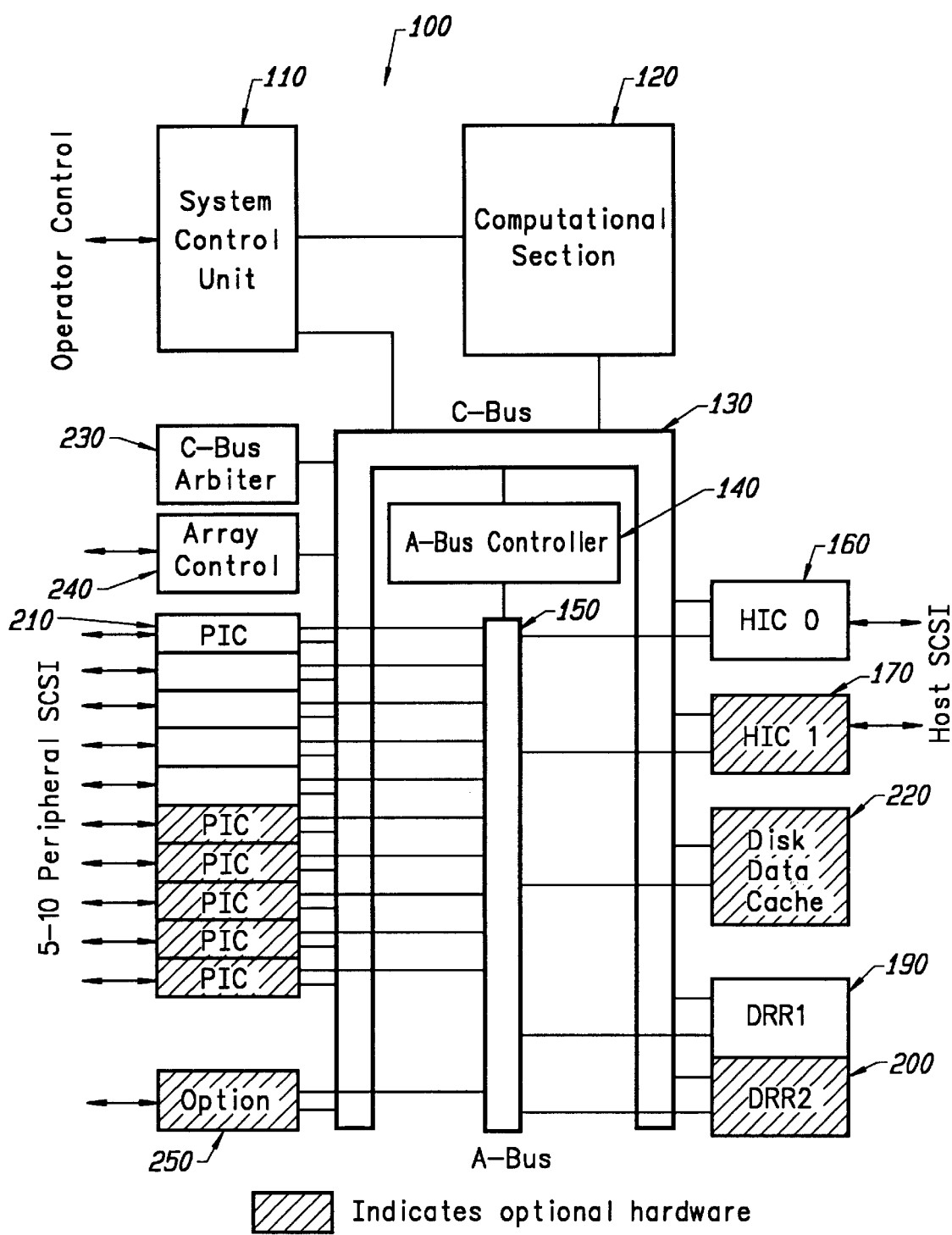
FIG. 1 shows a high level block diagram of the presently preferred embodiment of disk drive arrays made in accordance with the present invention.

FIG. 1 shows the overall system architecture of the redundant array of disk drives as practiced in the presently preferred embodiment. System 100 is configured as a stand-alone secondary storage system that interfaces with user configurations through system control unit 110 and hosts through host interface controllers 160 and 170. In the presently preferred embodiment, users make their specifications for performance and reliability to an off-line processor (not shown) and a data configuration, i.e. a striping and redundancy scheme, results. This configuration is inputted into system control unit 110. It will be appreciated that the off-line processing of user specification is not a necessary feature and that such processing could be accomplished by computation section 120 of FIG. 1

User processes reside and execute on hosts. These processes request I/O transactions during execution and these transactions are carried out in accordance with the data configuration scheme that was input into system control unit 110. It will be appreciated that the user might as well specify their requirements through user processes themselves, obviating the need for a separate system control unit.

The major components of system 100 include system control unit 110, computational section 120, command bus (C-Bus) 130, data bus (A-Bus) 150, A-Bus Controller (ABC) 140, Host Interface Controllers (HICs) 160 and 170, Data Redundancy and Reconstruction units (DRRs) 190 and 200, array of individual Peripheral Interface Controllers (PICs) 210, C-Bus arbiter 230, and array control 240. Optional hardware may be accommodated by option slot 250 as provided on A-Bus 150. The individual disk drives that connect to each PIC are not shown in FIG. 1.

Figure 2:
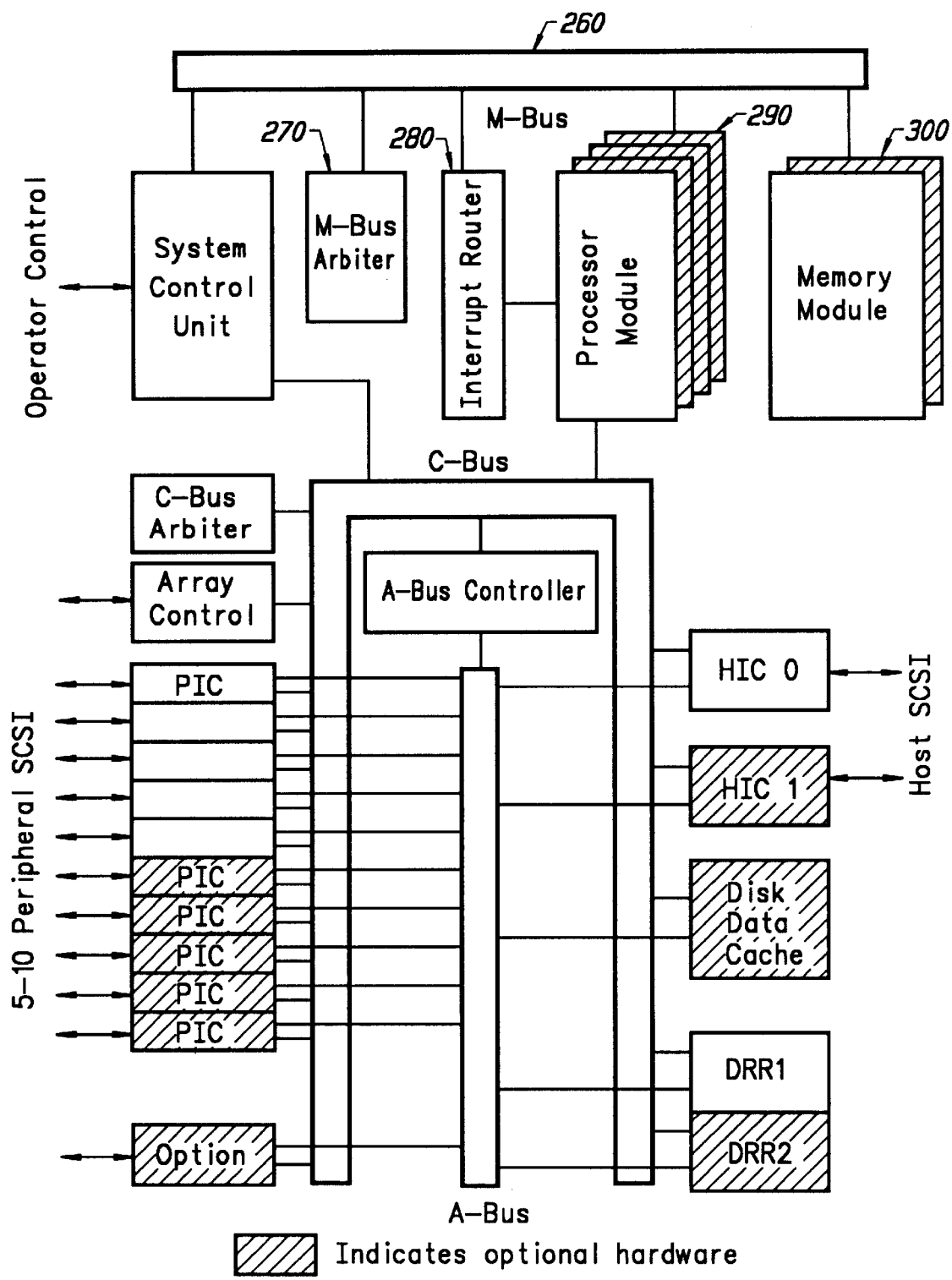
FIG. 2 shows a high level block diagram of the presently preferred embodiment with a multiprocessor section.

FIG. 1 depicts computation section 120 as a generalized block. In the presently preferred embodiment, computation section 120 can be configured for uniprocessor or multiprocessor environments. The uniprocessor environment employs a single processor together with DRAM (not shown) for memory storage. FIG. 2 shows in greater detail the multiprocessor environment.

Computation section 120 provides the system with necessary control signals. C-Bus 130 operations are controlled by computation section 120 and C-Bus arbiter 230 which resolves concurrent requests for C-Bus 130 access. In addition, computation section 120 services user requests through system control unit 110 or host system requests through HICs 160 or 170. It will be appreciated that the number of hosts and HICs are expandable and the current number of HICs should not regarded as a limitation on the present invention.

Users requesting secondary storage specify their system performance and data availability requirements. As discussed in greater detail below, a user specifies the total amount of storage required, the average size of a command, and its data availability requirement. All such user requests make up an initial 3-dimensional space, called user space. From user specifications, the system provides a iterative mapping of user space onto physical storage space. This mapping may be performed by computational section 120 or by a separate processor entirely. The results of the mapping are used by computational section 120 to manage and maintain the physical storage space.

As requests for I/O transactions are made by various hosts, computation section 120 translates the user addresses into physical addresses and sets up the appropriate data path in A-Bus by programming ABC 140. It will be appreciated that once the data path is set up, the data flows directly from any one node on the A-Bus to any other nodes without any intervening processing by computation section 120.

Figure 3:
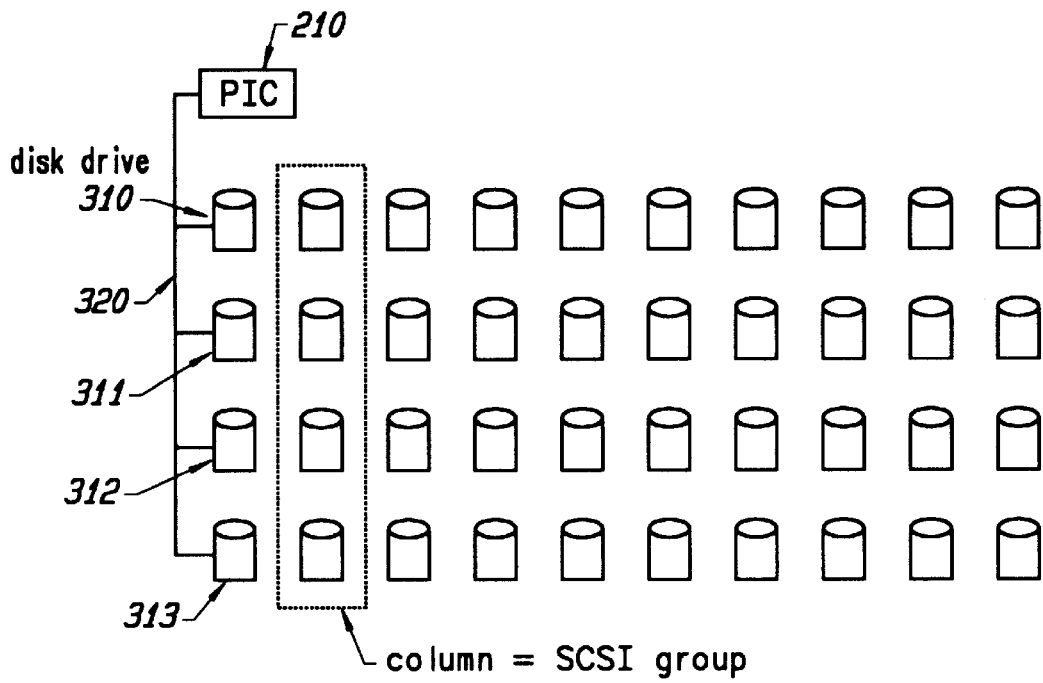
FIG. 3 shows the physical array of disk drives and their connection to individual Peripheral Interface Controller units via a communication interface.

As shown in FIG. 3, each PIC may be connected to a plurality of individual disk drives. In the presently preferred embodiment, the PICs are connected to 1 to 7 individual disk drives via a SCSI data path. Each PIC contains a 4 Kbyte FIFO buffer (not shown) for the purpose of coupling the SCSI communication path and A-bus 150.

In the presently preferred embodiment, the speed of the data flow across A-Bus 150 is 25 Mbytes/sec. The burst speed of data flow from an individual PIC to one of its connected disk drives is 5 Mbytes/sec. For a typical write request, data is striped and buffered into a PIC's FIFO buffer. Once data is placed into the FIFO buffer, the data can then be transferred into an individual disk drive attached to the individual PIC any synchronously.

For a typical read request, data blocks from the various PICs can be simultaneously accessed and placed into buffer storage for broadcast onto A-Bus 150. After the data in a PIC's buffer broadcasts on A-Bus 150, that PIC is able to retrieve more data blocks into its buffer while other PICs are simultaneously transmitting their data.

As discussed previously, data striping and buffering are used to achieve concurrency in the present invention. It will be appreciated, however, that the speeds of the A-Bus and the SCSI connection are not integral to the scope of the present invention and should not be construed as a limitation. Moreover, the present invention encompasses the use of any synchronous and asynchronous communication standard that can be used to connect the individual PIC with the individual disk drives—not just the SCSI standard. Likewise, it will be appreciated that the presently preferred size of the FIFO buffer should also not be construed as limitation.

System 100 provides data redundancy and reconstruction via DRR1 module 190 and DRR2 module 200. DRR1 190 and DRR2 200 provide for reconstruction of data from either one or two failed disks respectively. Users initially specify how many levels of redundancy that are desired, i.e. how many disk failures the user's data can tolerate.

As data is written into the array of disk drives, DRR1 190 and DRR2 200 calculate their particular redundancy code according to their separate algorithms. Computation section 120 directs what DRR code gets saved to one or more redundancy sectors in the array, depending upon the level of redundancy specified by the user. Accordingly, either no DRR codes, DRR1 code, or DRR1 and DRR2 codes are stored.

Disk Data Cache 220 is cache used to provide faster access to frequently used data in the read case and is used to hold write data until it may be written to individual PICs or HICs.

Array control 240 is used to control a variety of low level array functions like powering individual drives up or down.

As previously stated, FIG. 2 shows the overall system architecture with a multiprocessor as its computation section. In this alternative embodiment, a multiprocessor section replaces the general computation section depicted in FIG. 1 as computation section 120. In the presently preferred embodiment, system 100 can be configured for up to four processors. Multiprocessor bus (M-Bus) 260 provides the communications link for the various modules. Those modules include M-Bus arbiter 270, interrupt router 280, a plurality of processor modules 290, and a plurality of memory modules 300. Additionally, system control unit 110 communicates to the computation section via M-Bus 260 in the presently preferred embodiment.

M-Bus arbiter 270 arbitrates among all the various requests from the different modules for M-Bus 260 communication. In the presently preferred embodiment, each module attached to M-Bus 260 has several point-to-point signals running to M-Bus arbiter 270. Any module desiring use of M-Bus 260 must make a request to M-Bus arbiter 270. M-Bus arbiter 270 responds to such requests by issuing a grant to a single module while all other modules receive a busy signal.

Interrupt router 270 provides a means to dynamically distribute the interrupt load across processor modules 290. Any interrupt can be directed to any processor. Additionally, all of the processor modules 290 or any subset thereof may be interrupted at any given time.

Processor modules 290 provide the same functionality that the computation section 120 did in the uniprocessor environment. Processor modules 290 provide for control of system 100 through C-Bus 130. Processor modules 290 control the data flow on A-Bus as well as provide an interface to users through system control unit 110.

Memory modules 300 are a shared memory resource for processor modules 290. Memory modules 300 provide the same functionality that the DRAM provides for computation section 120 in the uniprocessor environment.

Having discussed the overview of the system architecture, it will now be explained how the system provides flexible storage for its users.

FIG. 3 shows in greater detail how the array of physical disk drives is connected to system 100. Individual disk drives 310 are connected to individual PICs 210 via a SCSI path 320. As depicted in FIG. 3, disk drives 310, 311, 312, 313 connect to PIC 210 to form a SCSI group 330. All disk drives and PICs in the array form similar SCSI groups. As stated above, each PIC 210 in the presently preferred embodiment can support from one to seven disks. It will be appreciated, however, that this range of numbers can be expanded to support an arbitrary number of disks via communication standards other than SCSI and should not be construed as a limitation on the present invention.

Figure 4:
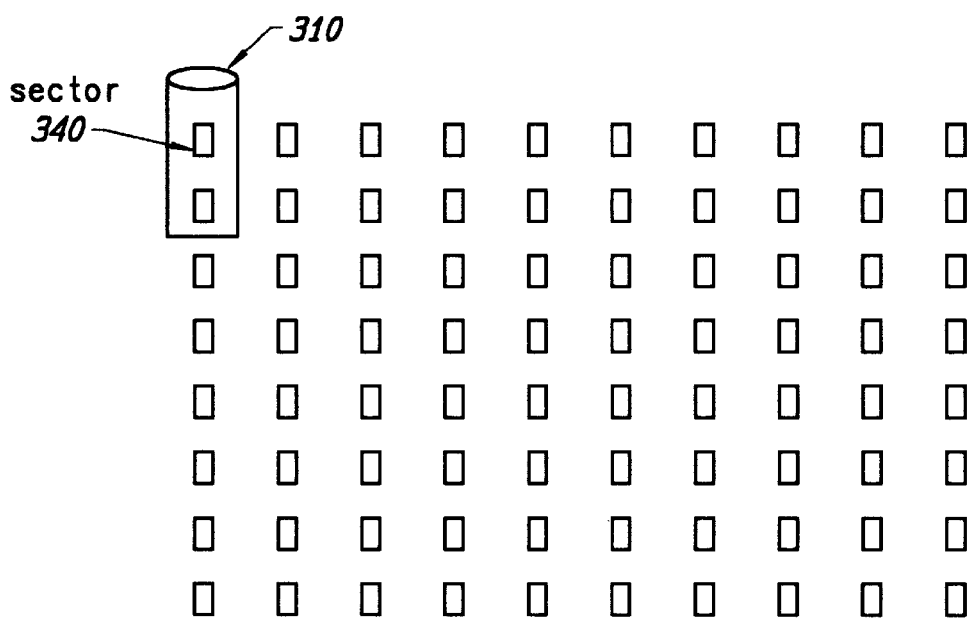
FIG. 4 shows the physical storage space as an array of disk sectors.

Before user data is stored in the array, the physical storage can be considered as an unstructured storage pool. FIG. 4 shows the unstructured physical storage space as an array of disk sectors provided by the individual disk drives. Each disk drive 310 contains a number of disk sectors 340. In the presently preferred embodiment, data sector 340 may be considered as the atomic unit of storage and stripe transaction size. It will be appreciated, however, that any arbitrary unit of storage may be used as a stripe degree unit.

Figure 5:
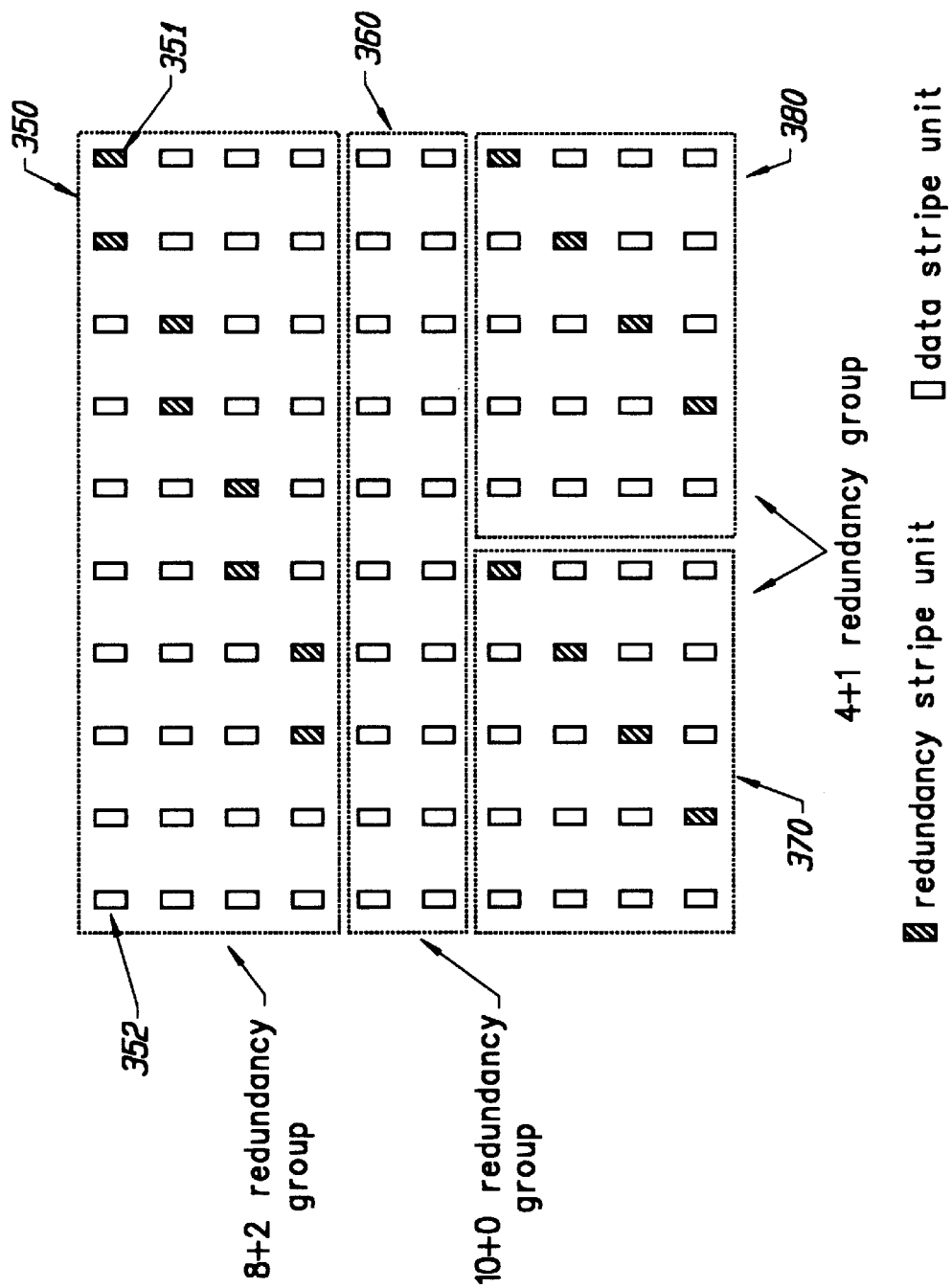
FIG. 5 illustrates a particular division of the physical storage space into four redundancy groups in response to user requests for storage.

Once users request storage, however, the physical storage space becomes partitioned. FIG. 5 illustrates a particular partitioning of the physical storage space in response to user requests. The partitions form redundancy groups that utilize common redundancy data. Four such redundancy groups, 350, 360, 370, and 380, are shown in FIG. 5. Partitioning from the user's perspective is configured to satisfy user performance, availability and capacity requirements.

As mentioned above, users specify performance requirements in terms of the size of an average database transaction. From this parameter, an stripe unit size and stripe degree are computed. The stripe degree can be computed according to two alternative formulas. The first formula is as follows:

$$L > 2M ** \frac{2[D + S + R]}{N}$$

where

L=the average command size in sector time,

M=the stripe degree,
D=the drive controller latency,
S=the average seek time,
R=the average rotational latency on a drive, and
N=the total number of drives The second alternate formula for computing stripe degree for a given partition is:

$$M = \sqrt{\frac{L*N}{D+S+R}}$$

Given the average command size as input and that the other quantities are known, the stripe degree is easily solved from either formula. This calculated stripe degree is close to optimal if the simplifying assumption is made that the average command size is the same for all other partitions on the system.

In the presently preferred embodiment, the stripe degrees for various average command sizes are pre-calculated according to the above formula and stored in a table in the system. Thus, after a user specifies its requirements for storage, the system performs a simple table look-up to find its stripe degree. Once the stripe degree has been set, the stripe unit size is easily calculated. The stripe unit size is equal to the average command size, L, divided by the stripe degree, M.

The resulting partition can be considered as a rectangle whose width corresponds to the stripe degree and whose height corresponds to the number of data stripes units required to hold the user's data. One user's specification may result in the creation of several partitions. Different partitions may result because the user has specified different performance and availability requirements for different data or because the user desires a different partition be created.

A redundancy group collects together partitions with the same availability property. A redundancy group is a rectangular subspace of the disk array data space. Its width corresponds to the total number of data and redundancy drives in the group and its height is a multiple of redundancy-stripe. A redundancy-stripe unit is the amount of redundancy data that is placed on any given disk. While it is to be appreciated that the redundancy-stripe unit may be of any size, it is in general a sector, track, cylinder, or an entire disk in the presently preferred embodiment.

A redundancy stripe is the minimum collection of redundancy-stripe units over which redundancy is computed. Thus, an n+r redundancy group is defined to have n+r redundancy-stripe units with r of those redundancy-stripe units being the redundancy units. To achieve the desired availability, it is required that no two redundancy-stripe units belonging to a particular redundancy stripe map to the same disk drive.

In the presently preferred embodiment, the system supports three levels of redundancy: none, one, or two. For first level redundancy, the redundancy group contains no redundancy stripe unit. In the second and third levels, redundancy stripe units are distributed across the drives of the group from right to left starting with the last drive in the group. For example, if the group had d data and r redundancy drives, then drive d+r gets the first redundancy stripe unit, while drive d+r-1 would get the second redundancy stripe unit, and so on until all r redundancy stripe units are placed.

The flexibility of the present invention lies in its ability to divide its physical storage space into logically separate redundancy groups. The present invention then maps compatible partitions into these redundancy groups. The data partitions are constructed to meet performance requirements while the redundancy groups meet availability requirements.

By way of illustration, FIG. 5 depicts four separate redundancy groups as they might be stored in the present invention. Group 350 is an 8+2 redundancy group. The redundancy stripe units, such as blackened unit 351, represent the redundancy-stripe units of the group. These redundancy stripe units are interspersed with 8 data-stripe units, such as unit 352. The height of group 350 indicates the total number of redundancy-stripe units required to satisfy user's storage request.

Group 360 depicts a 10+0 redundancy group. Group 360 has no redundancy-stripe units because the user specified no levels of redundancy protection. Lastly, groups 370 and 380 show two logically distinct 4+1 redundancy groups.

Figure 6:
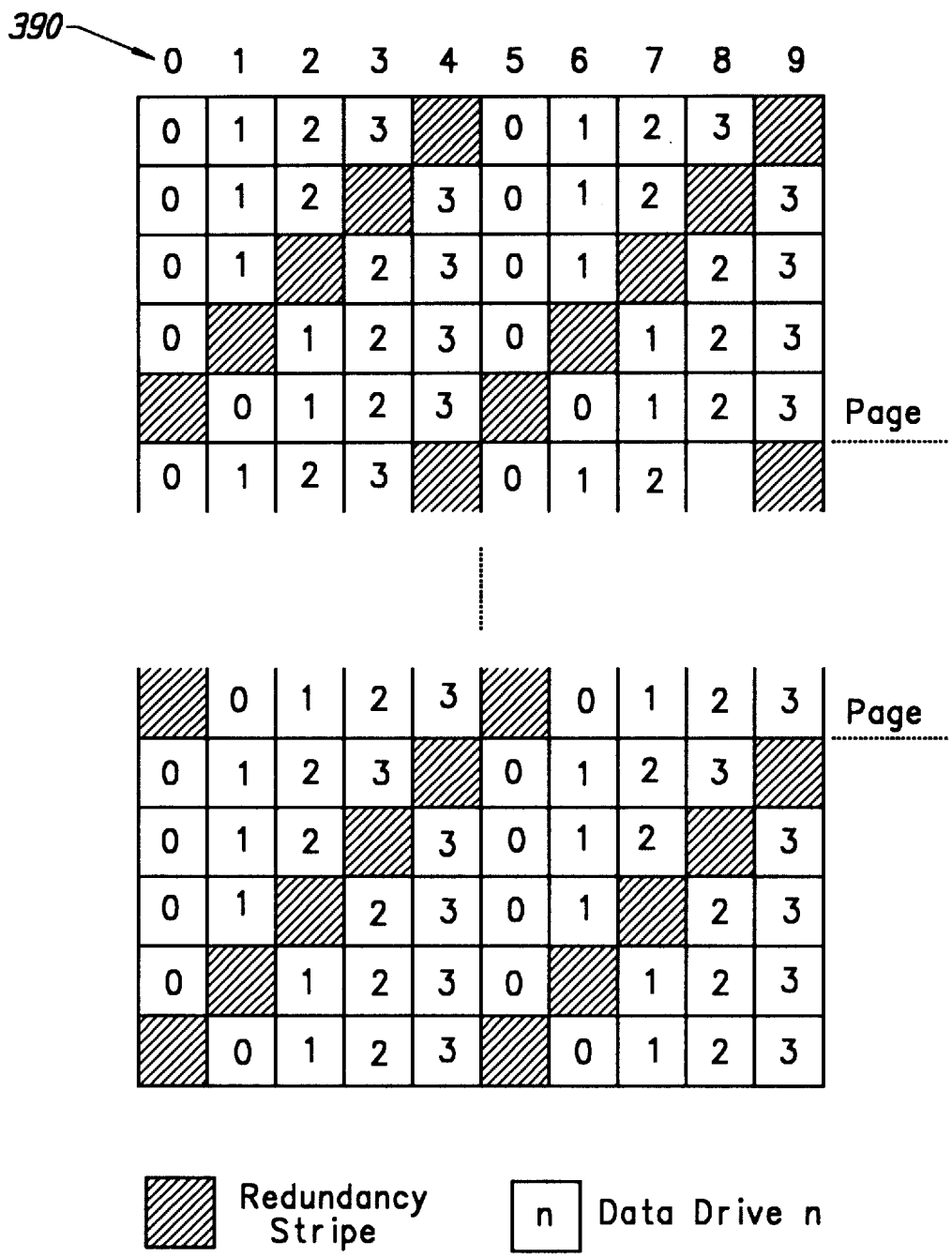
FIG. 6 illustrates how data stripe units are interspersed between redundancy stripe units in two adjacent 4+1 redundancy groups.
Figure 7:
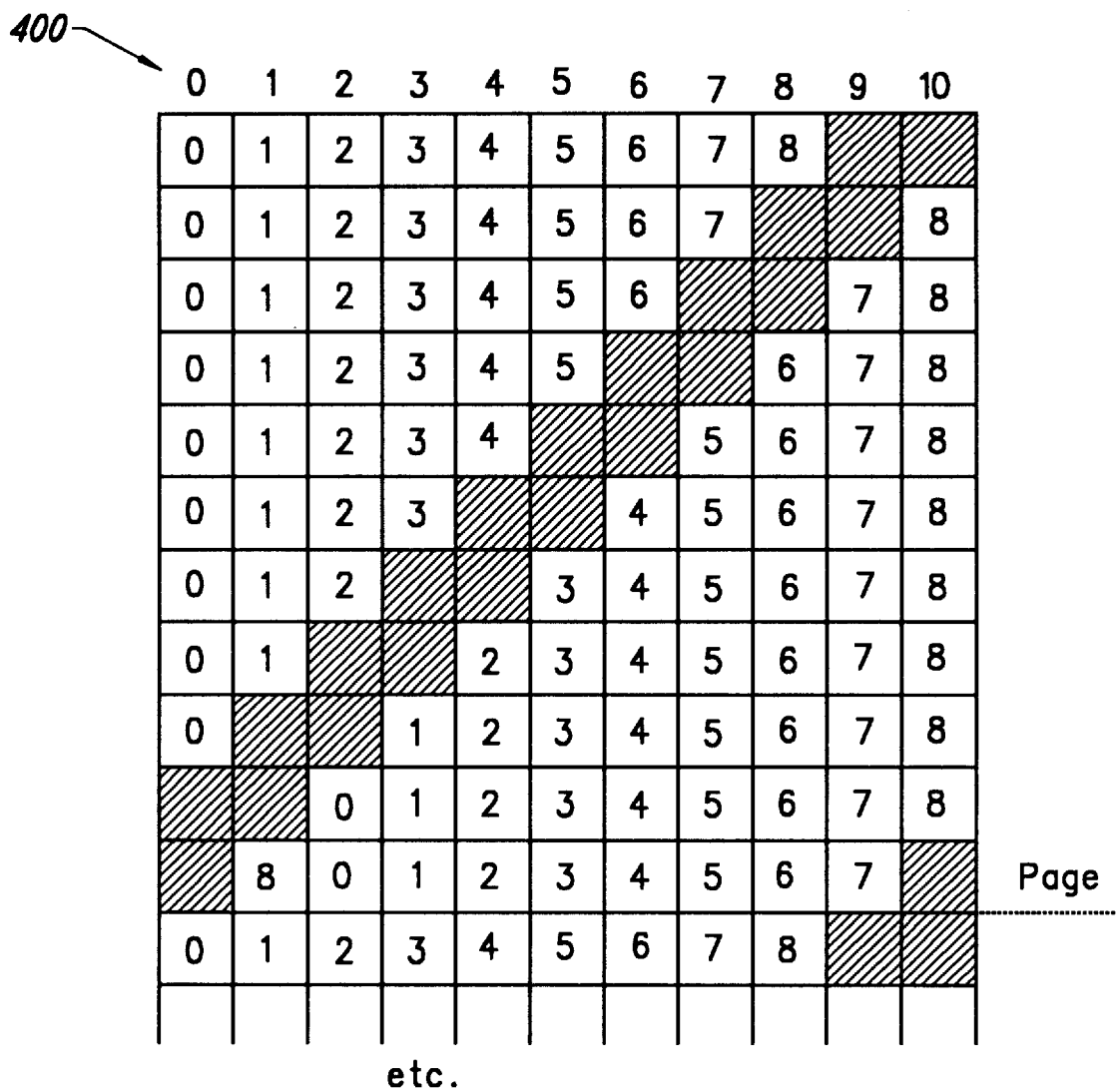
FIG. 7 illustrates how data stripe units are interspersed between redundancy stripe units in one 9+2 redundancy group.

As shown in FIG. 5, the present invention wraps the data stripe units around the redundancy stripe units, as the user data is mapped onto different rows of the redundancy group. FIG. 6 and FIG. 7 are two examples of how the present invention wraps the data-stripe units around the redundancy-stripe units to form a redundancy group. Essentially, the present invention shifts the current data-stripe unit r places to the right in a d+r redundancy group.

FIG. 6 depicts two logically separate 4+1 redundancy groups. The column numbers, 0–9, across the top of the rectangle represent disk drive numbers in the array. The first 4+1 redundancy group occupies disks 0–4 while the second 4+1 group occupies disks 5–9. Data stripe units, each labelled either 0,1,2, or 3, are wrapped to the right around the redundancy stripe unit. The redundancy stripe unit cascades from the upper right-hand corner in the first row, and every row equal to 1 modulo 5, down to the lower left-hand corner in every fifth row.

In another example, FIG. 7 shows how data stripe units wrap around both redundancy stripe units in a single 9+2 redundancy group.

Having discussed the manner in which the system saves data and redundancy stripe units in redundancy groups in physical storage, it will now be discussed how the system maps the initial user requests into an efficient storage arrangement in physical array.

User specifications for availability and performance are input into the system's mapping algorithm. These specifications describe and determine how the user's data will be partitioned. All partition descriptions must be available when the mapping is executed. Each description includes the following three fields of information: the availability requirement for the partition, expressed as mean time between data loss (MTBDL), the average transaction size, and the total capacity expressed as a blocksize and number of blocks.

Normally, user data is divided into partitions with regards to its nature and utilization. The partitioning might accommodate a redundancy requirement, or conformity to a standard interface, or for some other reason. In any case, each partition will require certain characteristics in terms of availability, performance, redundancy, etc. It is these requirements that will decide the method of mapping a partition onto the physical storage.

In the presently preferred embodiment, the basic unit of data of the partition is a block which is normally a multiple of physical data sectors.

From the average transaction size and capacity requirements, an optimal partition rectangle for each partition is obtained, as described above. The width of the partition corresponds to its stripe degree. The height of the partition corresponds to its capacity in stripe size units. The stripe degree, in general, is chosen as large as possible, ideally equal to the total number of drives in the subsystem. This increases the number of parallel commands even when only a single partition is active.

From the capacity and availability requirements of each partition, the mapping determines the minimum number of redundancy stripes to accommodate all the partitions, according to the following formula:

$$MTBDL = \begin{cases} \frac{MTBF}{N} & \text{for no levels of redundancy} \\ \frac{MTBF^2}{N*N-1*MTTR} & \text{for one level of redundancy} \\ \frac{MTBF^3}{N*N-1*N-2*MTTR} & \text{for two levels of redundancy} \end{cases}$$

where
MTBDL=mean time between data loss
MTBF=mean time between failure
MTTR=mean time to repair The mapping compares the MTBDL calculated above with the availability requirement specified by the user and selects the appropriate level of redundancy. After the level of redundancy is determined, the resulting redundancy group rectangles are packed into the array. This is accomplished by use of a standard bin packing algorithm which is well known in the art.

In the presently preferred embodiment, the above-mentioned mapping is actually a series of maps, performed for each and every command, that transform user requirements and host data into redundancy groups that are stored in physical storage. Specifically, from user specifications, the mapping transforms host data through several levels of spaces to arrive at the actual physical space. The first level is called host space. Host space is the addressing scheme of the hosts to which the system is connected. In the presently preferred embodiment, host space is three dimensional. Typically, a host space address is a 3-tuple consisting of a host number, a partition number, and a block number.

From host space, a one dimensional linearly ordered collection of data units is constructed. This linearly ordered space is called unified space. Unified space is an addressing scheme in which the differences among hosts and partitions no longer appear. Unified space is easily constructed from host space because the host space address defines a unique number when its tuple ordering is removed.

Figure 8A:
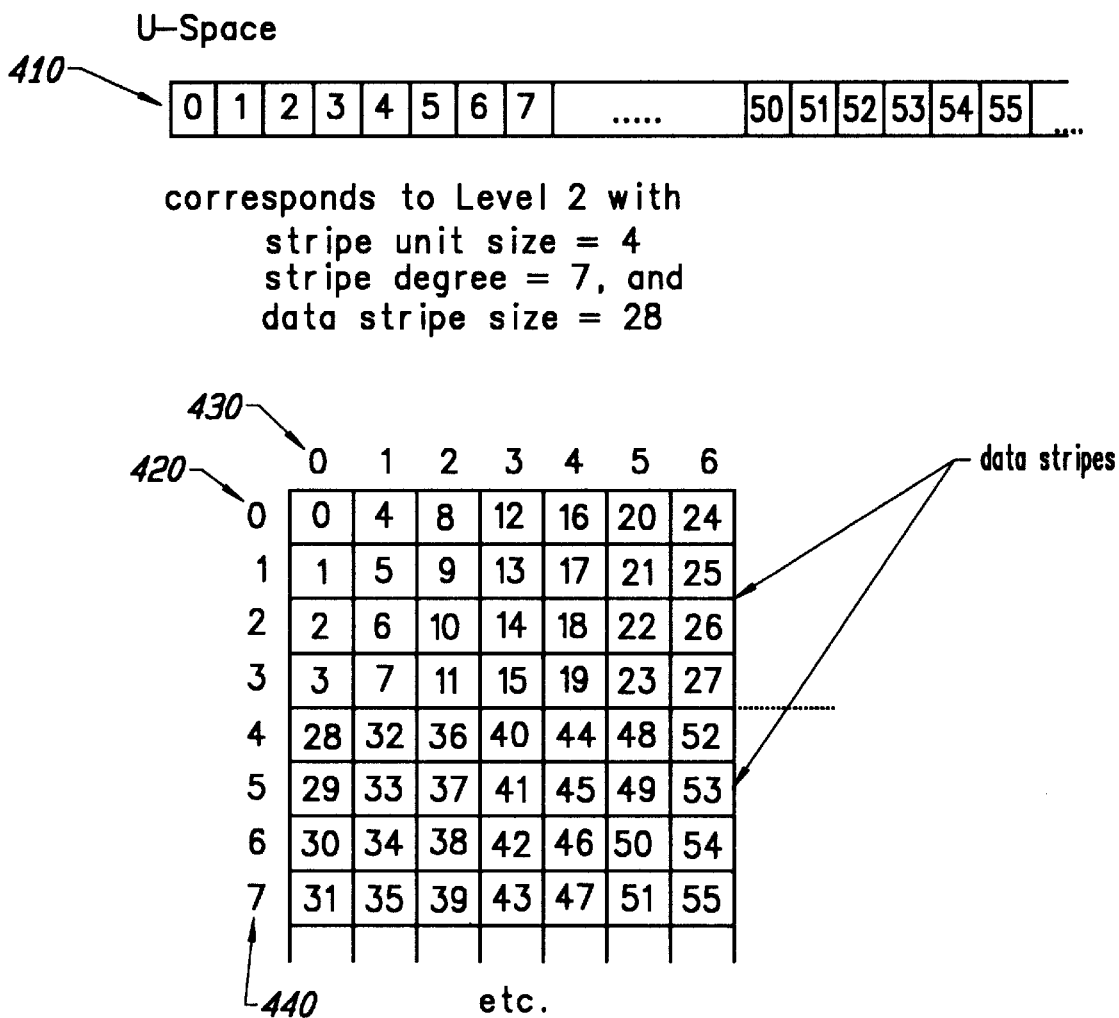
FIG. 8A illustrates how the mapping algorithm takes the points in the example unified space into an example 2-space structure corresponding to a stripe unit size of 4, stripe degree of 7, and data stripe size of 28.
Figure 8B:
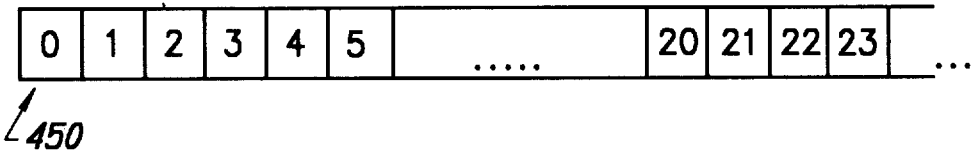
FIG. 8B gives another illustration of a mapping of points in a example unified space into an example 2-space structure corresponding to a stripe unit size of 1, and stripe degree of 4.
Figure 8B:
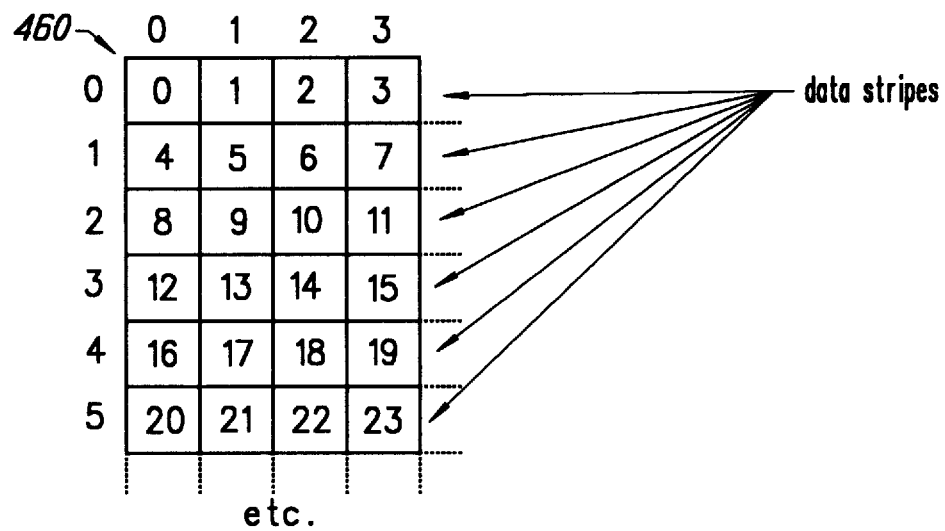

The next transformation takes points in unified space and maps them into points of what is called 2-space. By way of illustration, FIGS. 8A and 8B show two examples of how the mapping takes points in unified space and maps them into points of 2-space. Specifically, 2-space consists of a collection of two dimensional structures, called frames, depicted as element 420 in FIG. 8A. A frame corresponds to one or more host space partitions. Each frame may be considered as matrices having as many columns as the stripe degree of the corresponding partitions.

For example in FIG. 8A, unified space 410 is mapped into frame 420 with a stripe unit size of 4, a stripe degree of 7 and data stripe size of 28. These parameters were calculated from the user supplied specifications of average command size and capacity. The numbers 430 on top of frame 420 depict the data stripe degree for frame 420 whereas the numbers along the left side of frame 420 depict the particular stripe unit number.

In FIG. 8A, two data stripes, 0–27 and 28–55, of total size 28 are stored. The user specification have been translated by the mapping algorithm into the requirement that four data units be saved on a particular logical drive before storing data on another drive. Thus, data units 0–3 are stored on logical drive 0 before data unit 4–7 are stored on logical drive 1 and so on. The mapping has also specified a data stripe degree of 7. Thus, the break between data unit 27 and data unit 28 represents a separate data stripe altogether.

FIG. 8B gives another example of a mapping from unified space to 2-space. In this case, the mapping has specified that a single data stripe be constructed from its unified space 450. Frame 460 has been built according to user specifications. Those specification translate into a stripe unit size of 1 and a stripe degree of 4. Thus, it will be noticed that data unit 0 is stored in logical drive 0 followed by data unit 1 in logical drive 1, and so on until data unit 4 is stored on logical drive 0.

Once frames have been constructed, the mapping takes these frames and maps them into redundancy groups, in what is known in the present invention as level 3 space. This mapping proceeds in three stages. First, a target segment (i.e. the data referenced by a user command) in the frame is placed in the appropriate data columns. Second, the mapping into redundancy group data columns is adjusted for the presence of redundancy stripe units, if necessary. Such adjustment will not be necessary if the user's availability requirement is such that redundancy data is not needed to meet that availability requirement. Lastly, the adjusted redundancy groups are mapped into the physical drives.

Figure 9:
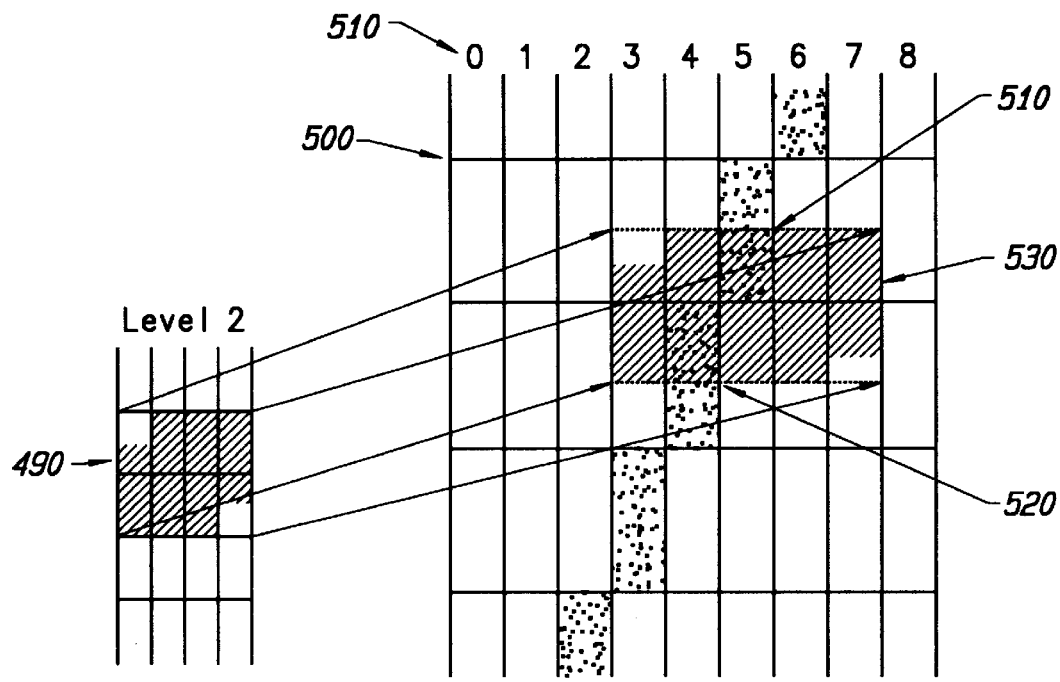
FIG. 9 illustrates a mapping of an example frame into a redundancy group in physical storage.

FIG. 9 illustrates a mapping of frame 490 into a redundancy group 500. The numbers 510 going across top of redundancy group 500 designate the physical disk drive numbers. It will be noticed that frame data 490 has a stripe degree of 4. When frame 490 is mapped into level 3 space 510, it is adjusted for the redundancy data stripe units requested by the user. The adjusted frame is depicted as 4+1 redundancy group 530 in FIG. 9. It will further be noticed that the stripe unit in level 3 space is twice the size of the stripe unit in frame 490. Thus, redundancy group 530 uses one half of the redundancy units 510 and 520.

FIG. 11 shows in greater detail the flow of the mapping algorithm in the presently preferred embodiment. The input into the mapping algorithm is a user command which consists of: a partition number a unified space offset from the beginning of the partition in unified space, a unified space length of the segment, and an operation code (e.g. read, write, or read-modify-write). The output of the mapping algorithm is a structure called a frame descriptor. More specifically, frame descriptors are matrices of frame descriptor nodes. A frame descriptor node contains: an operation code, the unified space address of the data segment the node representing the length of the segment, a list of knots created to carry out the transfer, the address of the DRR accumulators in which redundancy will be calculated if the operation is a write or read-modify-write, and the DRR coefficient to use in level 2 redundancy calculations. It will be appreciated that a frame descriptor has as many columns as the width in drives of the targeted redundancy group and has a length which is a function of the user command size.

The principal data structures used by the mapping algorithm are: the partition array and the redundancy groups array. The partition array contains an element for each partition. Each element in this array consists of: the starting unified space address; the length; the stripe unit size; the stripe degree; the redundancy group; the left-most column occupied by the partition in the redundancy group; the first redundancy stripe occupied by this partition in the redundancy group; the length of the partition in redundancy stripes; and the number of data stripes per redundancy stripe, if the data stripe size is less than the redundancy stripe size or zero otherwise. It will be noted that the data stripe size is a multiple of the redundancy stripe size or vice versa in the presently preferred embodiment.

The redundancy groups array contains an element for each redundancy group. Each element consists of: the redundancy stripe unit size; the redundancy group columns; the length of the redundancy group in redundancy stripes; the physical map which maps the redundancy groups to physical array space, the levels of redundancy (e.g. 0, 1, or 2); and the number of columns containing non-redundant data.

The physical map is an array of one dimensional arrays of columns map elements. Each column map element represents that portion of the redundancy group contained in a particular column (i.e. level 3 space) which is mapped to a particular array drive. A column map element consists of: the beginning redundancy stripe for the portion of the column assigned to the drive; the ending redundancy stripe for this portion of the column; the beginning physical space address for this portion of the column; and a Boolean value indicating whether the drive has failed.

Having now discussed how the system determines the mapping from user space into physical storage space, it will now be discussed how the system actually stores user data onto the physical storage. The present invention uses three data structures top to transfer the data to and from the array of disks using ABC 140. These data structures, called knots, threads, and strings, allow the system to keep an accounting of data saved on the array and allows for control of the length of each transfer and interrupts to ABC 140.

Figure 10:
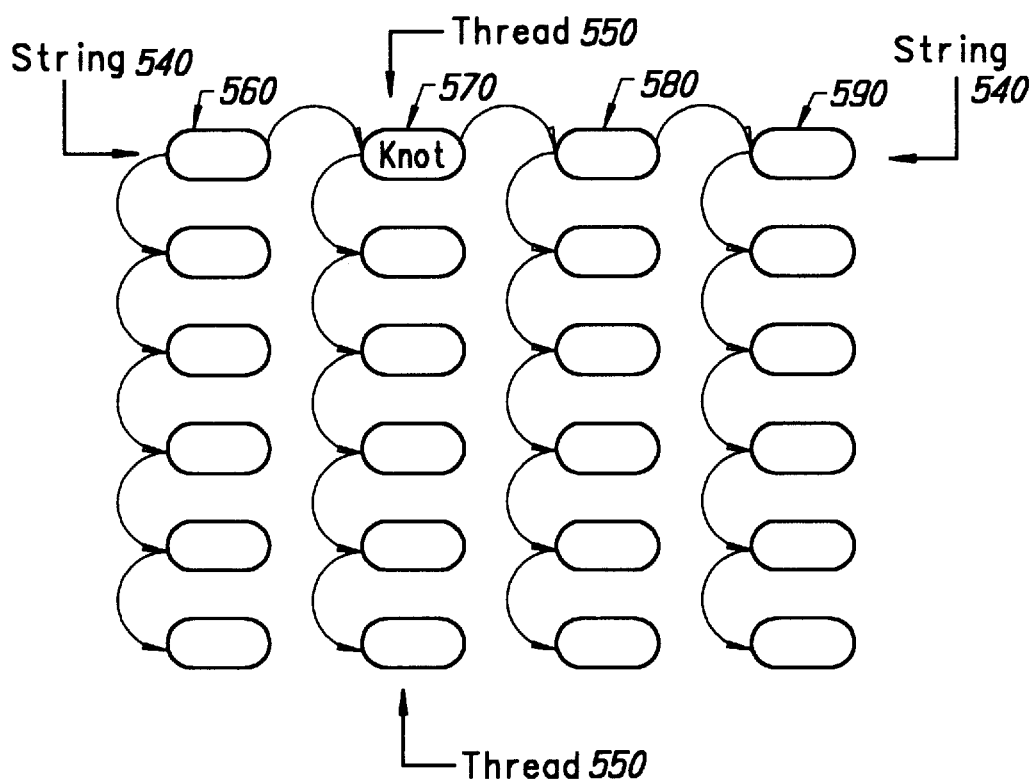
FIG. 10 illustrates the relationship between the three principal data structures, strings, threads, and knots, that are used to control the data flow from the HICs to the PICs and vice versa.
Figure 11A:
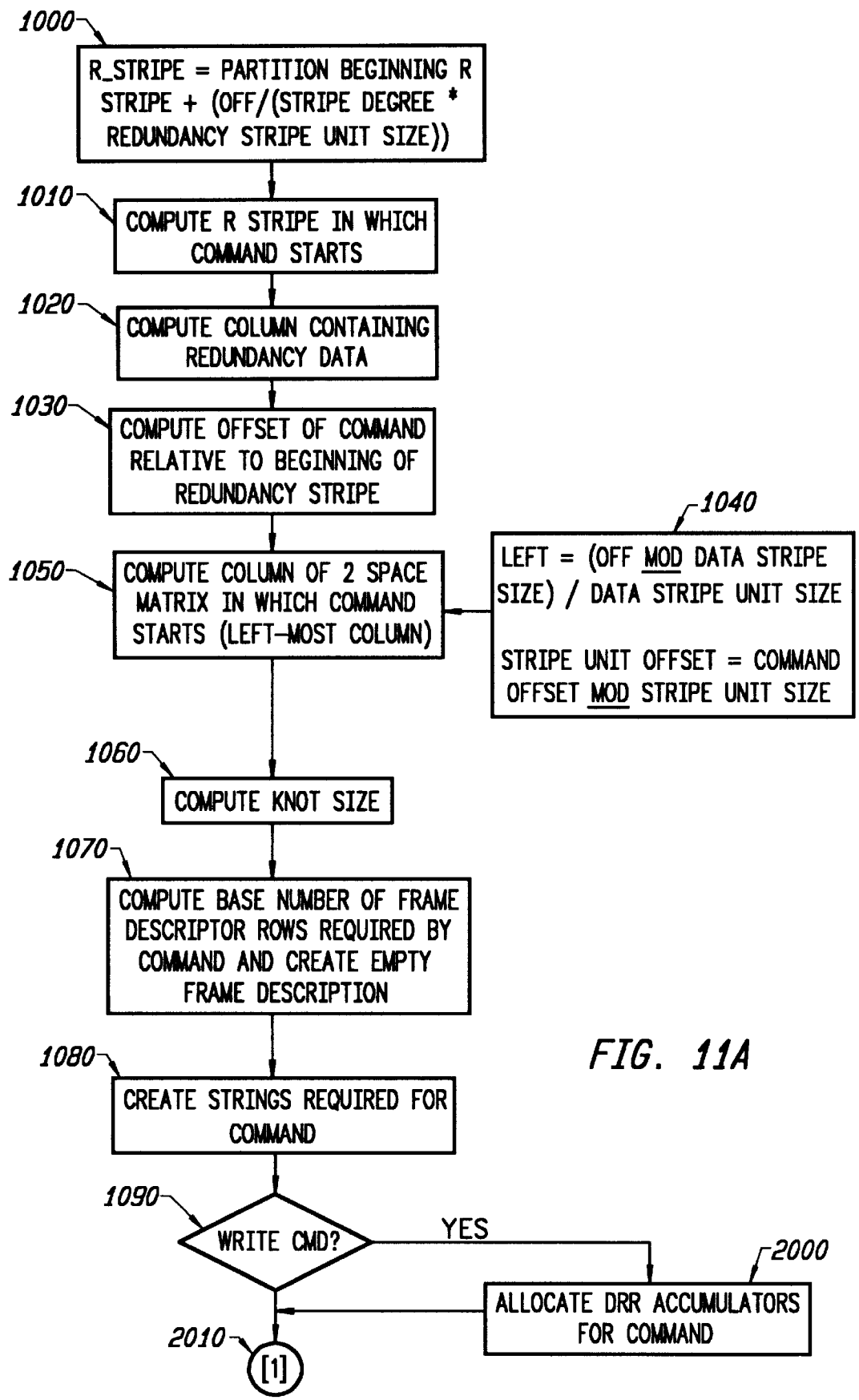
FIG. 11 gives a detailed flow chart of the mapping algorithm.
Figure 11B:
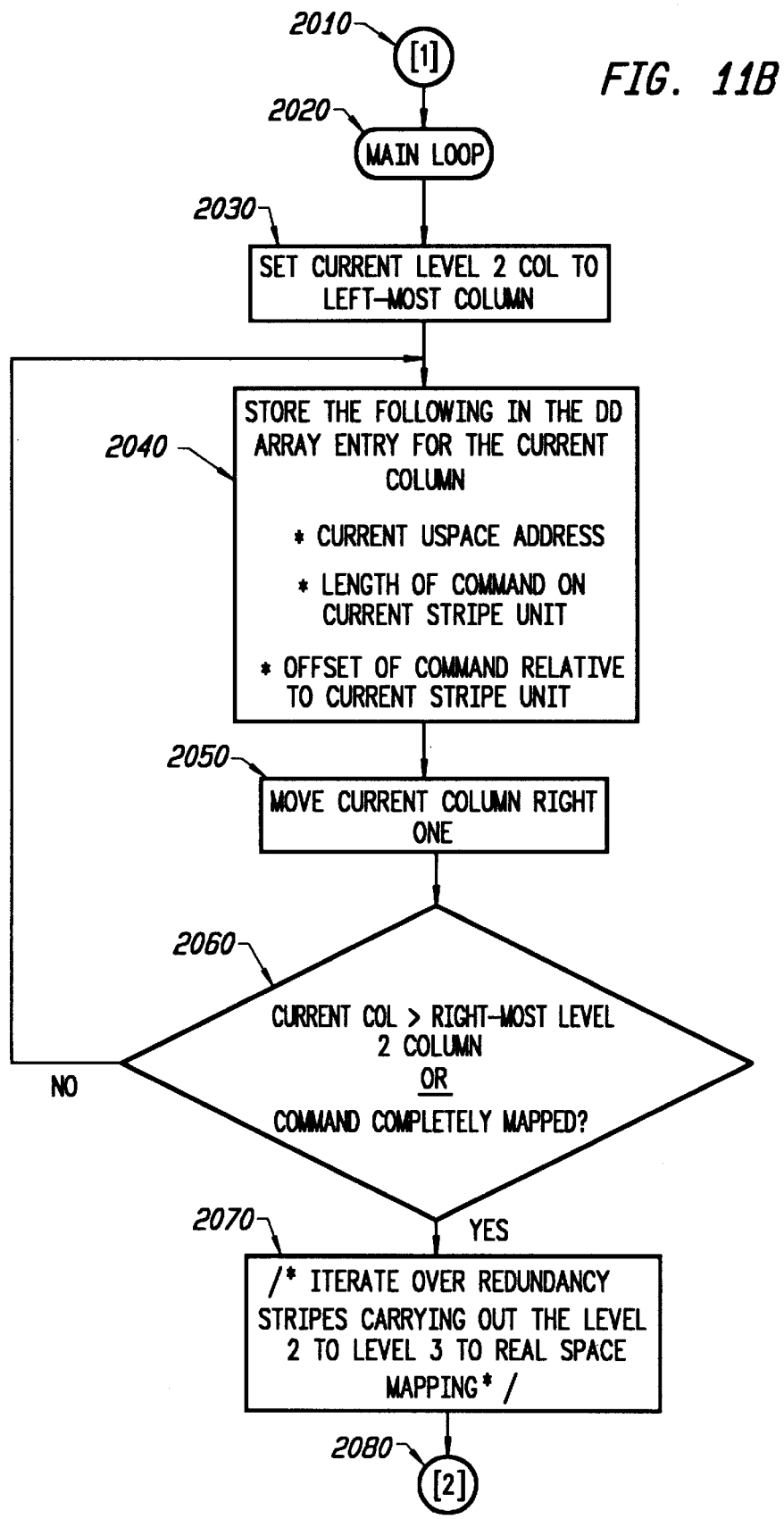
Figure 11C:
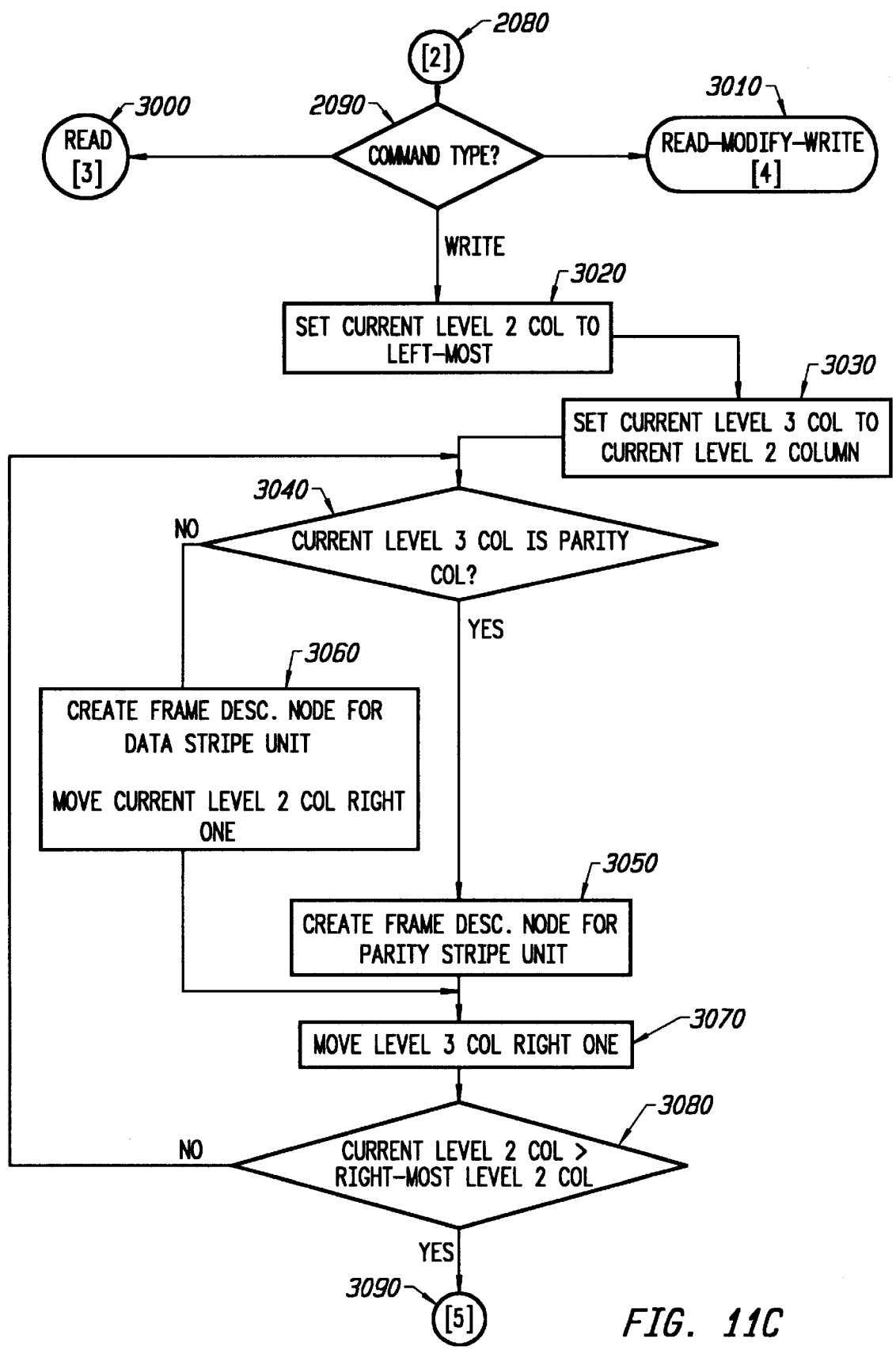
Figure 11D:
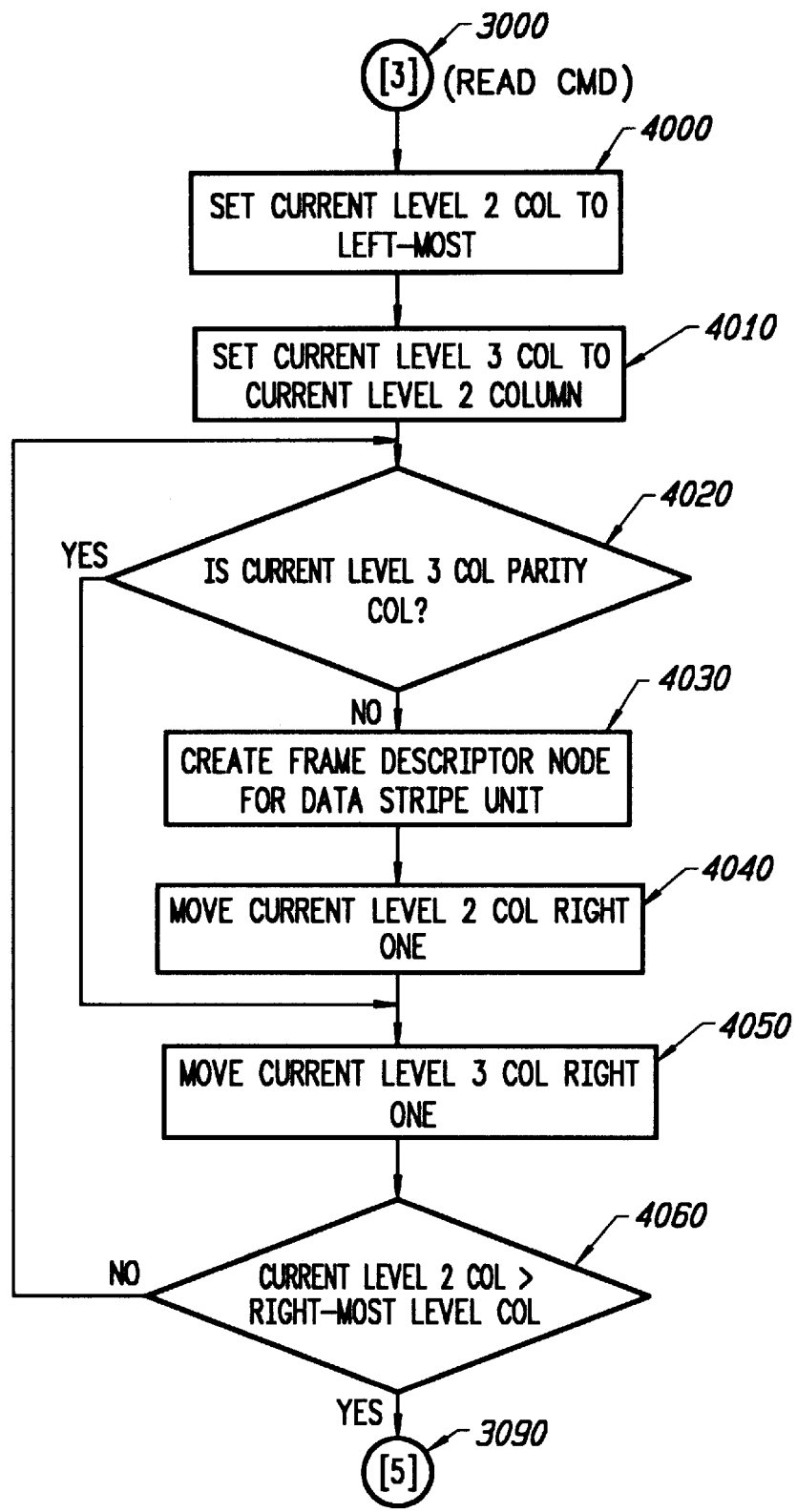
Figure 11E:
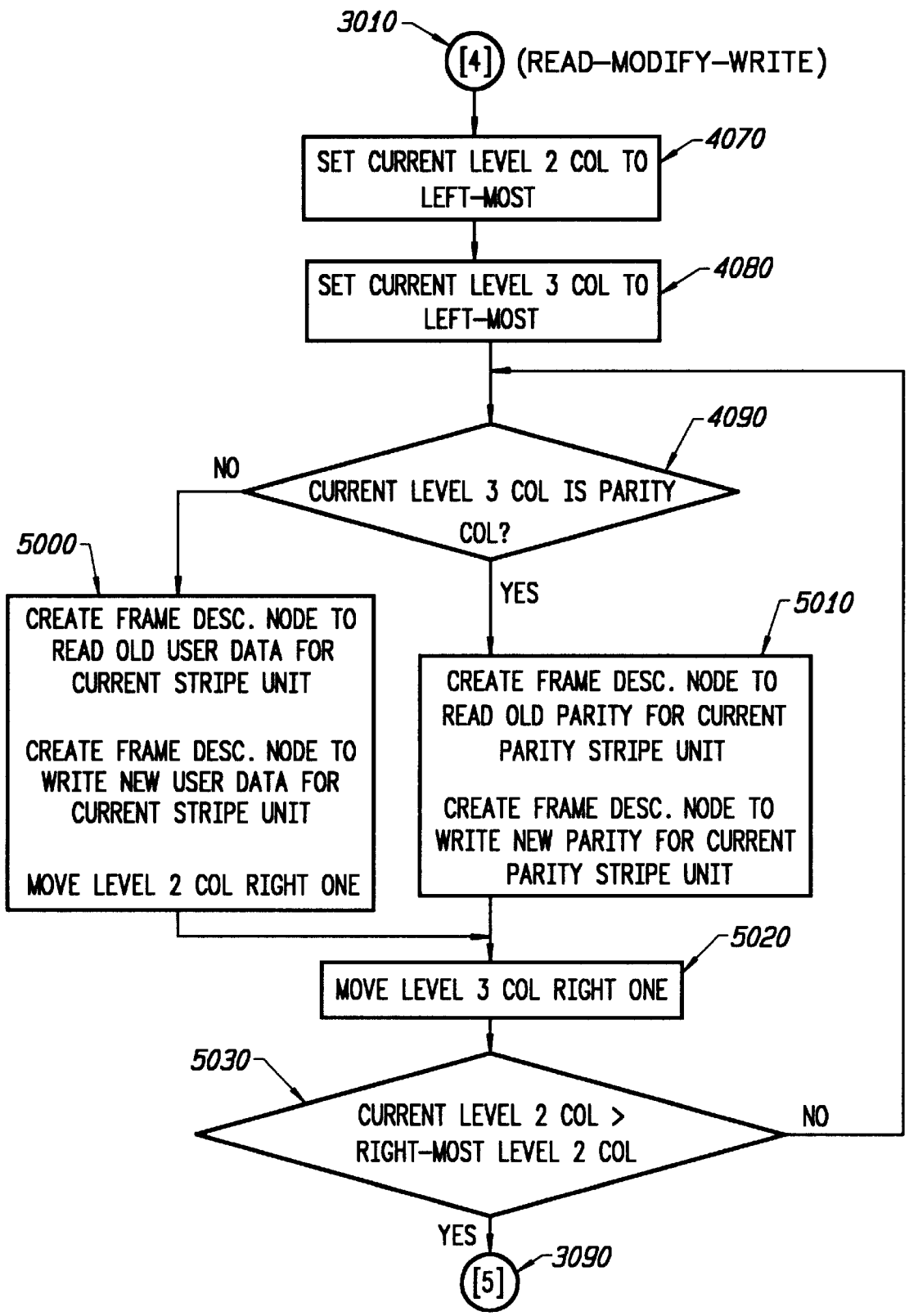
Figure 11F:
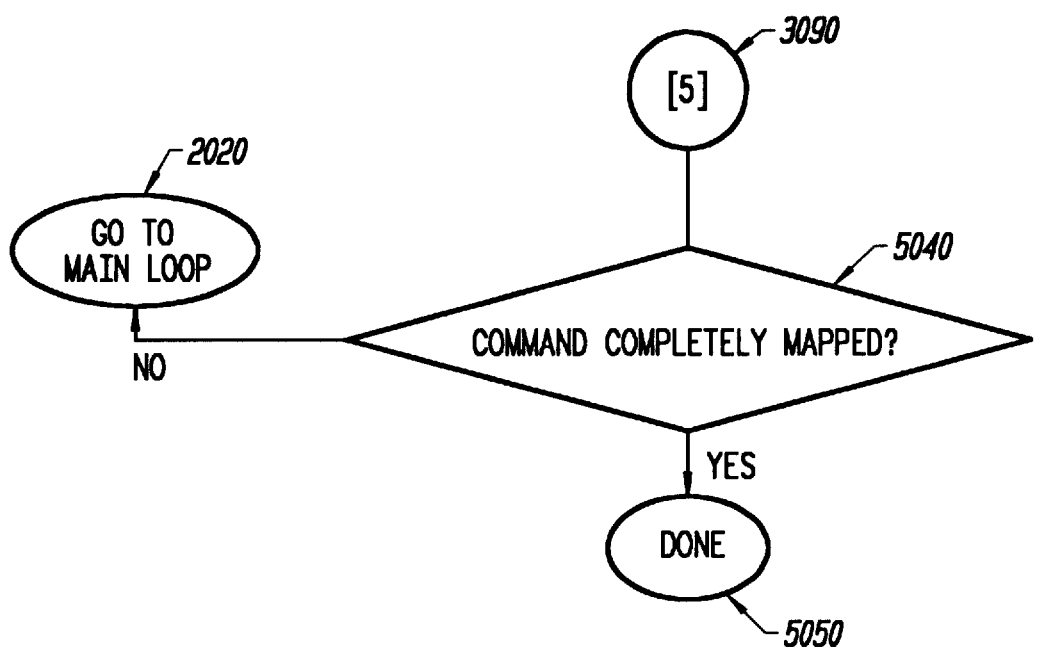

FIG. 10 shows the relationship between these three data structures. A knot represents a single A-Bus transaction. Such a transaction may be 512 bytes, 1 Kbyte, or any other size of transaction. In the presently preferred embodiment, knots are limited to 4 Kbytes, which is the size of the FIFO buffers located in the individual PICs. It will be appreciated that this particular size is arbitrary and should not be construed as a limitation on the present invention.

A thread is an ordered sequence of knots. Thus, the number of knots in a thread compares to the stripe unit size or, equivalently, the number of stripe units written to a given disk drive before the next disk drive is receives host data. In FIG. 10, there are 4 such threads.

A string is a collection of knots appearing at a given thread position. Strings can correspond to the stripe degree that is specified by user requirements. Strings are used by the system for the purpose of knowing when DRR redundancy data is ready to be stored as redundancy stripe units. This occurs when the count in the number of knots written to successive disks equals the stripe degree of the partition. In FIG. 10, there are 6 such strings.

For example, when knots 560, 570, 580, and 590 are written to each successive disk, the string count is decremented by one until the string count is zero. In such a case, a complete data stripe has been written and the redundancy data, that has been calculating concurrently with the writing of data, is ready for storage as a redundancy stripe unit.

The purpose behind the use of threads and strings is to use data structures that are similar to how data is laid out on the disk array. By mirroring the physical storage, these data structures are useful for the control of data flow from the HICs to the PICs and vice versa. Indeed, with the information provided by these data structures, computation section 120 is able to hand over complete control of the data flow to A-Bus controller 140.

Figure 12:
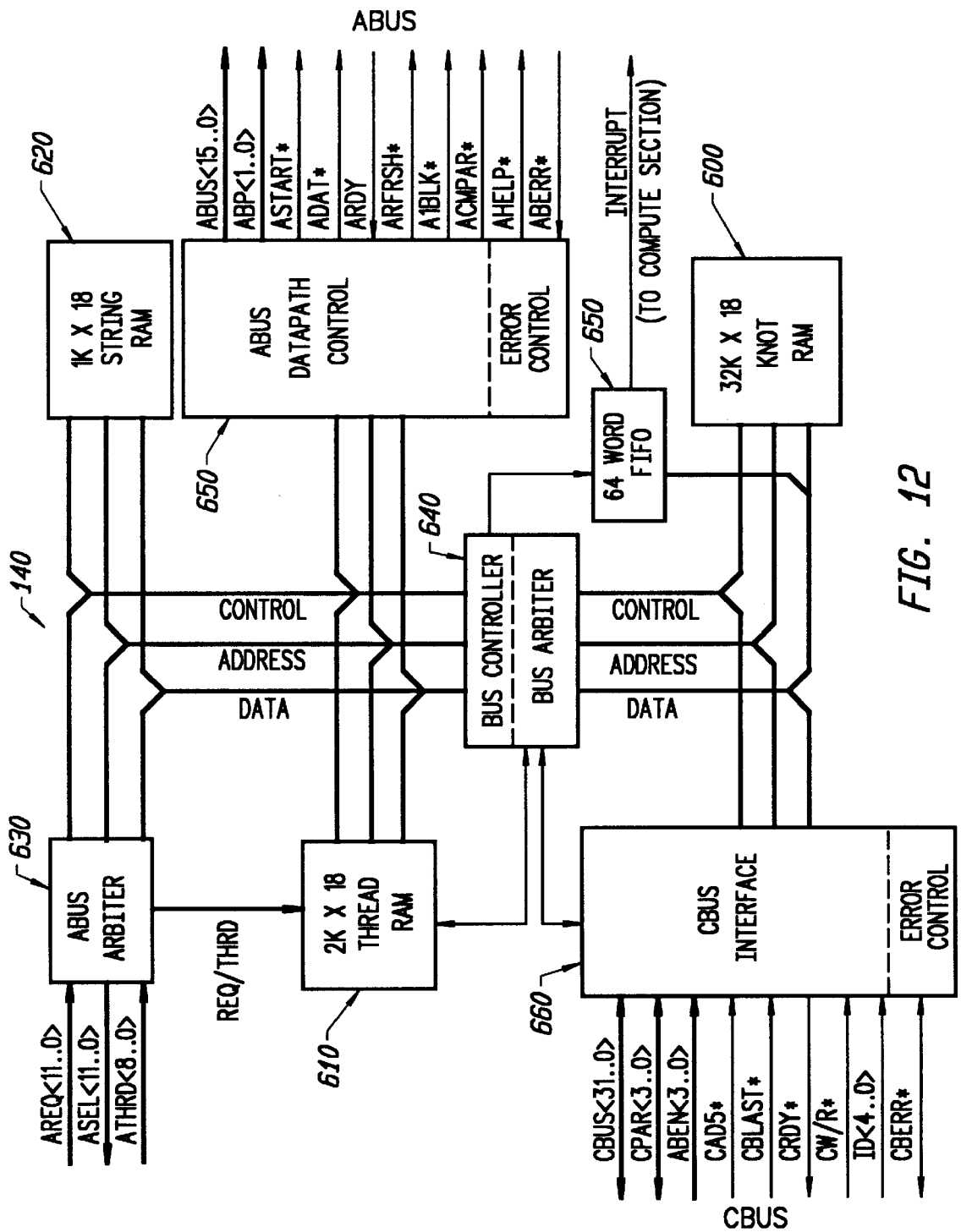
FIG. 12 shows the block diagram architecture of the A-Bus controller.

A-Bus controller 140 is provided with the necessary information about knots, threads, and strings in knot RAM 600, thread RAM 610 and string RAM 620, as shown in FIG. 12. A-Bus controller 140 architecture also includes A-Bus arbiter 630, Bus controller and arbiter 640, FIFO 650, C-Bus interface 660, and A-Bus data path control 650.

Knot RAM 600 contains two types of information: knot specific information required to move one or more blocks of data across A-Bus 150 and link fields to the next knot. Each knot in the knot RAM contains the following information fields: address start for DDC, HIC, and DRR, transfer length of each knot, interrupt control bits which tell if the current knot will force an interrupt, an internal request control field which initiates a request to transfer the DRR results, decrement string count which tells if the current knot should decrement the string count field in the string RAM by one, next knot address, next string address, next valid control field which are control bits for the next knot in the current thread.

Thread RAM 610 contains two types of information: information about the next knot that is scheduled to occur within a thread, and control information that is common to all knots in a thread. Specifically, thread RAM contains 512 different thread locations and each thread location contains the following information fields: knot address, string address, DRR control, HIC control, DRR coefficient valid control and DDC control.

String RAM 620 contains information required to manage strings of knots. Strings are used to link together a number of threads. The most common use for strings is to manage a DRR operation. String RAM 620 contains 1024 string locations and each location has the following information fields: string count which is a decreasing count of knots in a string (a count of zero indicates a DDR1 and DRR2 complete signal), a DRR2 complete bit which indicates that the DRR2 computation is complete and the result is ready to be stored in the array, a DRR initialize bit which tells the system that the first knot of the string is appearing and to restart DRR calculations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a data storage system for storing host data upon user request comprising a computational section, a data bus controller, a data bus responsive to signals from said data bus controller, a plurality of peripheral controllers coupled to said data bus, a plurality of data storage devices coupled to each said peripheral controllers, said data storage devices providing a physical storage space for the storage of said host data, and at least one host controller coupled to said data bus;

a method for orthogonally mapping a subset of host data, whereas different subsets of data contains associated parameters, from user specifications for system performance and data availability onto said physical storage space, said method comprising the steps of:

(a) receiving as an input user specifications associated with a subset of host data to be stored in said storage system, said user specifications including the average command size in said subset, the overall size of said subset and the meantime between data loss desirable for said subset of host data;

(b) calculating a partition for said subset of said host data, said partition sized using said user specifications for the average command size and the overall size of said subset;

(c) calculating the level of redundancy for said subset of said host data using said user specification for meantime between data loss; and (d) mapping the resulting redundancy group formed in step (c) into said physical storage space.

2. The method as recited in claim 1 wherein the step of calculating a partition for the subset of host data using user specifications further comprises the steps of:

determining the stripe degree from user specifications for system performance;

determining the stripe unit size from user specification for system performance.

3. The method as recited in claim 2 wherein the step of determining the stripe degree from user specifications for system performance further comprises calculating the stripe degree according to the formula:

$$L > 2M^{**}\frac{2[D+S+R]}{N}$$

where

L=the average command size,
M=the stripe degree,
D=the drive controller latency,
S=the average seek time,
R=the average rotational latency on a drive, and
N=the total number of drives.

4. The method as recited in claim 2 wherein the step of determining the stripe degree from user specifications for system performance further comprises calculating the stripe degree according to the formula:

$$M = \sqrt{\frac{L*N}{D+S+R}}.$$

5. The method as recited in claim 2 wherein the step of determining the stripe unit size from user specifications for system performance further comprises setting the stripe unit size equal to the average command size divided by the stripe degree.

6. The method as recited in claim 1 wherein the step of calculating the level of redundancy for said partition using user specifications for data availability further comprises the steps of:

calculating the mean time between data loss according to the formula $$MTBDL = \begin{cases} \dfrac{MTBF}{N} & \text{for no levels of redundancy} \\ \dfrac{MTBF^2}{N*N-1*MTTR} & \text{for one level of redundancy} \\ \dfrac{MTBF^3}{N*N-1*N-2*MTTR} & \text{for two levels of redundancy} \end{cases}$$

where

MTBDL=mean time between data loss
MTBF=mean time between failure
MTTR=mean time to repair;

choosing the level of redundancy for said partition that gives the least upper bound on the mean time to data loss specified by user.

7. The method as recited in claim 6 wherein the step of choosing the level of redundancy for said partition that gives the least upper bound on the mean time to data loss specified by user further comprises choosing the greatest number of levels of redundancy offered by the system if said least upper bound does not exist.

8. A data storage apparatus having a computational section, a data bus controller, a data bus responsive to signals from said data bus controller, a plurality of peripheral controllers coupled to said data bus, a plurality of data storage devices coupled to each of said peripheral controllers, said data storage devices providing a physical storage space for the storage of host data, at least one host controller coupled to said data bus, said data storage apparatus comprising:

means for calculating a partition required to store a subset of said host data, whereas different subsets of data contains associated parameters, said means for calculating a partition receiving as an input user specifications for the average command size in said subset and the overall size of said subset, said partition sized based on said average command size and said overall size;

means for calculating a level of redundancy for said subset using user specifications for the meantime between data loss;

means for creating a redundancy group from said partition and said calculated level of redundancy; and means for mapping said redundancy group into said physical storage space.

9. The apparatus as recited in claim 8 wherein the means for calculating a partition further comprises:

means for determining the stripe degree; and means for determining the stripe unit size from said user specifications for the average command size and the overall size of said host data subset.

10. A data storage apparatus having a computational section, a data bus controller, a data bus responsive to signals from said data bus controller, a plurality of peripheral controllers coupled to said data bus, a plurality of data storage devices coupled to each said peripheral controllers, said data storage devices providing the physical storage space for said system, at least one host controller coupled to said data bus, said data storage apparatus comprising:

a) means for calculating a partition for the host data using user specifications for the average command size and the total capacity required, said means for calculating a partition including means for determining the stripe degree calculated according to the formula:

$$L > 2M^{**}\frac{2[D+S+R]}{N}$$

where

L=the average command size,
M=the stripe degree,
D=the drive controller latency,
S=the average seek time,
R=the average rotational latency on a drive, and
N=the total number of drives and means for determining the stripe unit size from user specifications for the average command size and the total capacity required;

b) means for calculating the level of redundancy for said partition using user specifications for the mean time between data loss;

c) means for creating a redundancy group from said partition and said calculated level of redundancy; and d) means for mapping said redundancy group into said physical storage space.

11. A data storage apparatus having a computational section, a data bus controller, a data bus responsive to signals from said data bus controller, a plurality of peripheral controllers coupled to said data bus, a plurality of data storage devices coupled to each said peripheral controllers, said data storage devices providing the physical storage space for said system, at least one host controller coupled to said data bus, said data storage apparatus comprising:

a) means for calculating a partition for the host data using user specifications for the average command size and the total capacity required, said means for calculating a partition including means for determining the stripe degree and means for determining the stripe unit size from user specifications for the average command size and the total capacity required, said means for determining the stripe degree calculated according to the formula:

$$M = \sqrt{\frac{L*N}{D+S+R}}$$

b) means for calculating the level of redundancy for said partition using user specifications for the mean time between data loss;

c) means for creating a redundancy group from said partition and said calculated level of redundancy; and d) means for mapping said redundancy group into said physical storage space.

12. The apparatus as recited in claim 9 wherein the means for determining the stripe unit size further comprises setting the stripe unit size equal to the average command size divided by the stripe degree.

13. A data storage apparatus having a computational section, a data bus controller, a data bus responsive to signals from said data bus controller, a plurality of peripheral controllers coupled to said data bus, a plurality of data storage devices coupled to each said peripheral controllers, said data storage devices providing the physical storage space for said system, at least one host controller coupled to said data bus, said data storage apparatus comprising:

means for calculating a partition for the host data using user specifications for the average command size and the total capacity required;

means for calculating the level of redundancy for said partition using user specifications for the mean time between data loss, said means for calculating the level of redundancy for said partition further includes a) means for calculating the mean time between data loss according to the formula $$MTBDL = \begin{cases} \frac{MTBF^2}{N*N-1*MTTR} & \text{for one level of redundancy} \\ \frac{MTBF^3}{N*N-1*N-2*MTTR} & \text{for two levels of redundancy} \end{cases}$$

where

MTBDL=mean time between data loss

MTBF=mean time between failure

MTTR=mean time to repair; and b) means for choosing the level of redundancy for said partition that gives the least upper bound on the mean time to data loss specified by user;

means for creating a redundancy group from said partition and said calculated level of redundancy; and means for mapping said redundancy group into said physical storage space.

14. The apparatus as recited in claim 13 wherein the means for choosing the level of redundancy for said partition that gives the least upper bound on the mean time to data loss specified by user further comprises choosing the greatest number of levels of redundancy offered by the system if said least upper bound does not exist.

15. The apparatus as recited in claim 8 wherein said means for mapping said redundancy group into said physical storage space further comprises:

means for programming said data bus controller such that said data bus controller controls the data flow on said data bus without intervention from said computation section.

16. The apparatus as recited in claim 15 wherein said means of programming said data bus controller further comprises:

a storage area;

a plurality of data structures, said data structures representing the manner in which host data will be stored in said physical storage space;

a means for storing data structure values into said storage area.

* * * * *